United States Patent [19]

Bohrer et al.

[11] Patent Number: 4,683,159
[45] Date of Patent: Jul. 28, 1987

[54] SEMICONDUCTOR DEVICE STRUCTURE AND PROCESSING

[75] Inventors: Philip J. Bohrer, Minneapolis; Robert E. Higashi, Bloomington; Robert G. Johnson, Minnetonka, all of Minn.

[73] Assignee: Honeywell Inc., Minneapolis, Minn.

[21] Appl. No.: 876,651

[22] Filed: Jun. 17, 1986

Related U.S. Application Data

[63] Continuation of Ser. No. 798,725, Nov. 18, 1985, abandoned, which is a continuation of Ser. No. 634,087, Jul. 25, 1984, abandoned, which is a continuation-in-part of Ser. No. 429,598, Sep. 30, 1982, Pat. No. 4,501,144.

[51] Int. Cl.$^4$ .......................... B32B 3/14; B44C 1/22; C03C 25/06
[52] U.S. Cl. .................................. 428/138; 428/700; 428/446; 428/210
[58] Field of Search ............... 73/204; 156/647, 659.1, 156/662; 357/55; 428/166, 446, 629, 688, 138, 210, 700

[56] References Cited

U.S. PATENT DOCUMENTS 4,343,768  8/1982  Kimura .................................. 73/204
4,472,239  9/1984  Johnson et al. .................... 357/55 X

OTHER PUBLICATIONS

Bean, Kenneth "Anisotropic Etching of Silicon" in IEEE Trans. on Elec. Devices, vol. Ed-25, #10, 10/78, pp. 1185-1193.
Seidel et al "Studies on the Anisotrophy and Selectivity of Echants used for the Stress-Free Structures" in the Electrochemical Soc. Extended Abst. 5/82, pp. 194-195.
Siedel et al "Three Dimensional Structuring of Silicon for Sensor Applications" in Sensors & Actuators Journal, pp. 455-463.

Primary Examiner—Herbert Goldstein
Attorney, Agent, or Firm—Charles G. Mersereau

[57] ABSTRACT

An composite semiconductor device and a method of making is described. The device includes a semiconductor body with a first surface having a predetermined orientation with respect to a crystalline structure in the semiconductor body and a layer of thin film material covering at least a portion of the first surface. A depression formed in the first surface of the body with the layer of thin film material defines one or more members which have a predetermined configuration bridging the depression. First and second openings in the thin film layer flank each member such that an anisotropic etch placed on the openings undercuts the member to form the depression in a manner which substantially prevents undercutting of the semiconductor body below the thin film material at the boundaries of the predetermined configuration.

14 Claims, 8 Drawing Figures

SEMICONDUCTOR DEVICE STRUCTURE AND PROCESSING

The present application is a continuation of patent application Ser. No. 798,725 filed Nov. 18, 1985, now abandoned which is a continuation of Ser. No. 634,087 filed July 25, 1984, now abandoned, which, in turn, is a continuation-in-part of Ser. No. 429,598 filed Sept. 30, 1982, now U.S. Pat. No. 4,501,144.

BACKGROUND AND SUMMARY OF THE INVENTION

The present invention relates to integrated semiconductor device technology in the field of sensors and radiant sources of electromagnetic energy. More specifically, the present invention relates to a method and structures of the class described in U.S. Pat. Nos. 4,472,239 and 4,478,077. Such devices have applications in areas including flow sensing, detection of combustible gases, humidity sensing, and pressure sensing. However, neither these devices nor the present invention is limited to such applications.

The present invention comprises a semiconductor device and a method for fabricating the semiconductor device.

The present invention comprises a method of fabricating a semiconductor device comprising a thin film member having a predetermined configuration bridging a depression etched into a first surface of a semiconductor body. The member is connected to the first surface at first and second substantially opposing ends of the predetermined configuration. The depression opens to the first surface along an edge on each side of the member. The method comprises the steps of providing a semiconductor body with a first surface having a predetermined orientation with respect to a crystalline structure in the semiconductor body. A layer of thin film material of which the member is comprised is applied onto the first surface. First and second openings are exposed through the thin film material to the first surface. The first opening is bounded in part by one edge of the member. The second opening is bounded in part by the other edge of the member. Both openings are also bounded in part by a boundary connected to an edge of the member. At least one of the boundaries has a predetermined boundary configuration formed so that, when an anisotropic etch is placed on the openings to undercut the member and form the depression, there will be no substantial undercutting of the semiconductor body below the thin film material at the predetermined boundary configuration.

The present invention further comprises an integrated semiconductor device comprising a semiconductor body with a first surface having a predetermined orientation with respect to a crystalline structure in the semiconductor body. The semiconductor body has a depression formed into the first surface of the body. A layer of thin film material covers at least a portion of the first surface. A thin film member comprising the layer of material has a predetermined configuration bridging the depression. The member is connected to the first surface at substantially opposing ends of the predetermined configuration. The depression opens to the first surface along an edge on each side of the member. The layer of thin film material comprises first and second openings, the first opening being bounded in part by one edge of the member, the second opening being bounded in part by the other edge of the member. Both openings are also bounded in part by a boundary connected to an edge of the member. At least one of the boundaries has a predetermined boundary configuration formed so that, when an anisotropic etch is placed on the openings to undercut the member and form the depression, there will be no substantial undercutting of the semiconductor body below the thin film material at the predetermined boundary configuration.

Substantially eliminating undercutting of the semiconductor body below the thin film material at the predetermined boundary configuration substantially eliminates overhang of the thin film material at these locations. Substantially avoiding such overhang is frequently important since such overhang is frequently wasted space on a semiconductor chip. Such area is unavailable for diodes on other electronic structures in the semiconductor body. Further, because of breakage possibilities in handling and processing, thin film conductors such as gold conductors on the order of 0.3-0.5 microns thick cannot be wisely placed there because they add stress to the overhang, which, if it fractures, will cause an open circuit as well as possible mechanical and thermal interference if a fragment is lodged, for example, under the bridged structures of the present invention. In addition, making the openings without substantial overhang facilitates air flow and/or thermal isolation of the bridged member from the semiconductor body. Accordingly, devices in accordance with the present invention avoid wasted space on semiconductor chips, enhance thermal isolation of elements on the bridged member, and result in small, less costly and more reliable chips and devices.

DETAILED DESCRIPTION OF THE PREFERRED EMBODIMENTS

Although structures in accordance with the present invention have many applications as indicated above, the present invention will be disclosed in part using an example of a preferred embodiment of a flow sensor compatible with the present invention. As previously indicated, however, the present invention is not limited to flow sensors.

Figure 1:
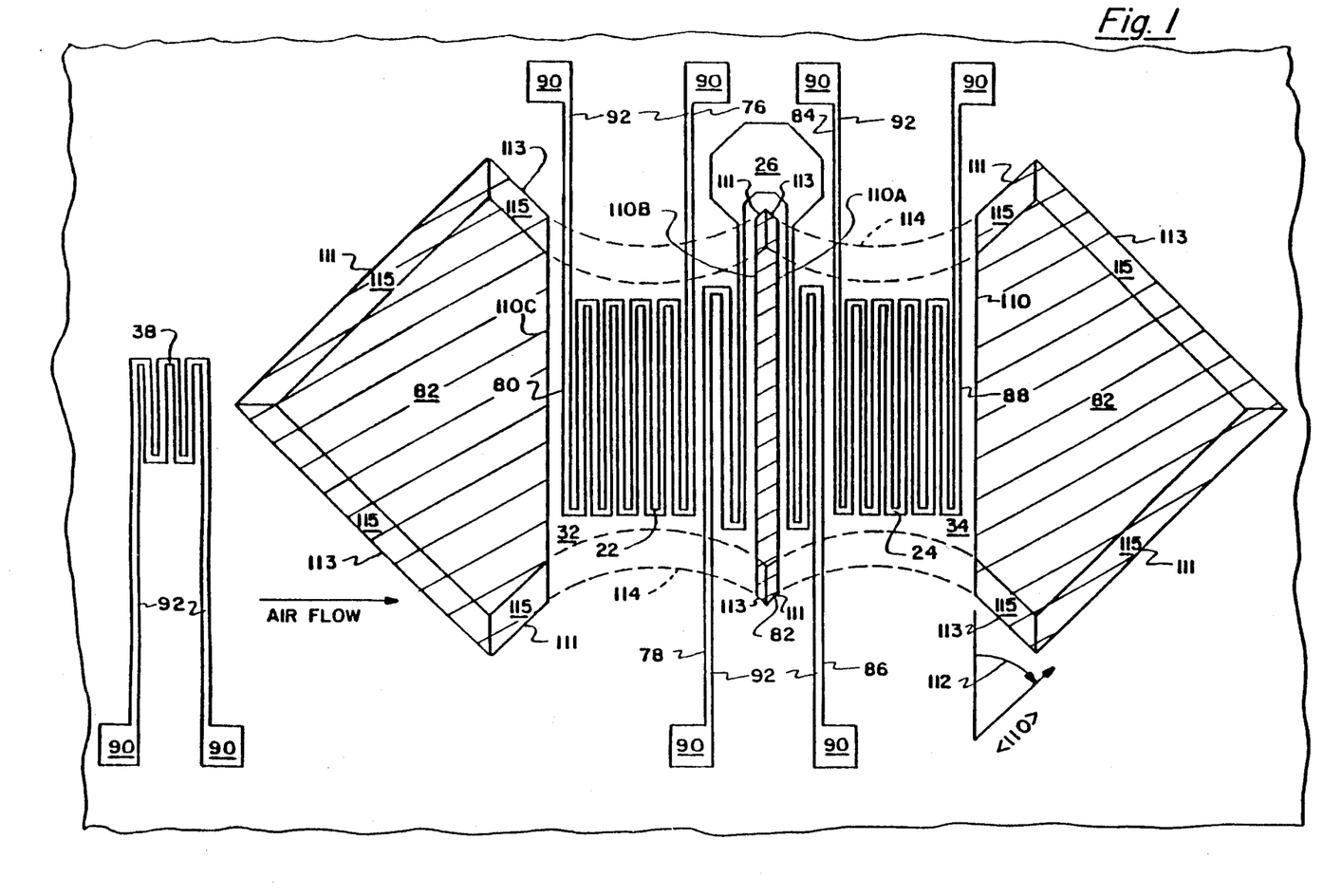
FIGS. 1, 1A, 1B and 2-5 illustrate the preferred embodiment of a flow sensor compatible with the present invention.
Figure 1A:
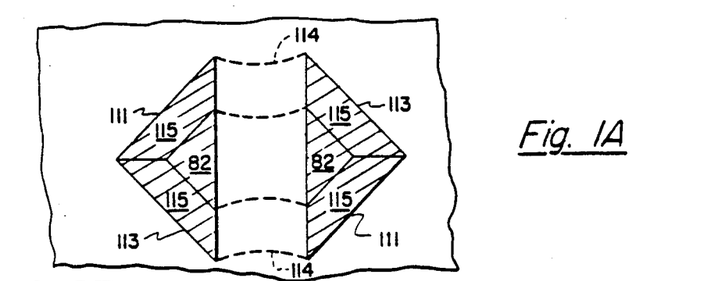
Figure 1B:
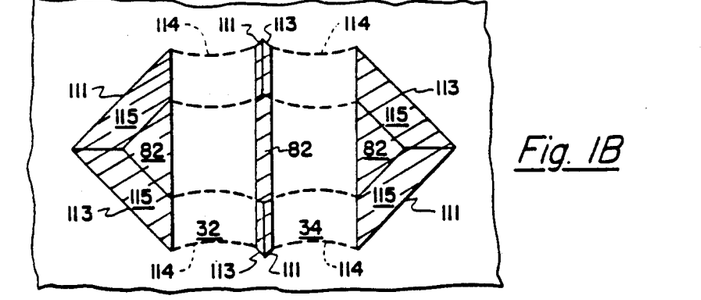

Devices in accordance with the present invention can have a single bridged member such as illustrated in FIG. 1A or a plurality of bridged members such as 32 and 34 illustrated in FIG. 1B and in FIGS. 1-5. Structures in accordance with the present invention typically comprise static electric, thermal-to-electric, and/or electric-to-thermal elements, usually in thin film form, as part of the bridged members. Such structures have many applications, including those listed above.

The present invention comprises a method of fabricating a semiconductor device comprising a thin film member such as 32 or 34 having a predetermined configuration bridging a depression such as 30 etched into a first surface 36 of a semiconductor body 20. A member such as 32 or 34 is connected to first surface 36 at first and second substantially opposing ends of the predetermined configuration. Depression 30 opens to first surface 36 along an edge on each side of the member, e.g., edges such as 110 or 110A (member 34) or such as 110B or 110C (member 32).

The method comprises the steps of providing a semiconductor body such as 20 with a first surface 36 having a predetermined orientation with respect to a crystalline structure in the semiconductor body. A layer such as 28 or 29 of thin film material of which a member is comprised is applied to first surface 36. First and second openings such as 82 are exposed through the thin film material to first surface 36.

The first opening is bounded in part by one edge of a member (e.g., edge 110) the second opening being bounded in part by the other edge of the member (e.g., edge 110A). Both openings are also bounded in part by a boundary connected to an edge of the member. At least one of the boundaries has a predetermined boundary configuration formed so that, when an anisotropic etch is placed on openings such as 82 to undercut members such as 32 or 34 and form a depression such as 30, there will be no substantial undercutting of the semiconductor body below the thin film material at the predetermined boundary configuration.

Such a method results in a structure without substantial overhang of thin film materials such as 28 or 29 at the predetermined boundary configuration, and this is of advantage in many situations as previously indicated.

A preferred method of fabricating the present invention includes providing a semiconductor body comprising (100) silicon having a (100) plane, a 110 direction, and a first surface such as 36 substantially parallel to the (100) plane. A layer of thin film material such as layers 28 and 29 of which members such as 32 or 34 are comprised is applied to first surface 36.

First and second openings such as 82 are exposed through the thin film material to first surface 36. Openings such as 82 are defined so that members such as 32 or 34 are oriented at a non-zero angle to the 110 direction. The first opening such as 82 is bounded in part by one edge of a member (e.g., edge 110 of member 34), and the second opening such as 82 is bounded in part by the other edge of the member (e.g., edge 110A of member 34). Both openings such as 82 are also bounded in part by a boundary connected to an edge of the member. At least one of the boundaries has boundary components such as 111 substantially in line with the 110 direction or boundary components such as 113 substantially normal to the 110 direction.

An anisotropic etch is applied to the exposed surface areas 82 to undercut the member and create a depression 30 under the member.

Using such a preferred procedure, there will be no substantial overhang of thin film materials such as 28 or 29 along the boundary components 111 and 113 substantially in line with or normal to the 110 direction.

The preferred embodiment of a flow sensor comprising the present invention includes a pair of thin film heat sensors 22 and 24, a thin film heater 26, and a base 20 supporting the sensors and heater out of contact with the base. Sensors 22 and 24 are disposed on opposite sides of heater 26.

Body 20 is preferably a semiconductor body and preferably silicon, chosen because of its adaptability to precision etching techniques and ease of electronic chip producibility. The sensor preferably includes two identical temperature sensing resistor grids 22 and 24 acting as the thin film heat sensors and further includes a centrally located heater resistor grid 26 acting as the thin film heater. Sensors 22 and 24 and heater 26 are preferably fabricated of nickel-iron, herein sometimes referred to as permalloy, having a preferred composition of 80% nickel and 20% iron. The sensor and heater grids are encapsulated in a thin film of dielectric, typically comprising layers 28 and 29 and preferably silicon nitride, to form thin film members. In the embodiment shown in FIG. 1, the sensor comprises two thin film members 32 and 34, member 32 comprising sensor 22 and member 34 comprising sensor 24, each member comprising one-half of heater 26.

The preferred embodiment the disclosed sensor further comprises an accurately defined air space which results in an air space effectively surrounding elements 22, 24, and 26. The effectively surrounding air space is achieved by fabricating the structure on silicon surface 36, thin film elements 22, 24, and 26 preferably being encapsulated in thin film silicon nitride film, and by subsequently etching an accurately defined air space into silicon body 20 beneath members 32 and 34.

The operation of the present sensor in sensing air flow can be described with reference to FIG. 1. Heater resistor grid 26 operates at a preferred constant average temperature difference of 100–200 degrees centigrade elevated above the temperature of silicon chip 20 which temperature is not appreciably different from the ambient air stream temperature. The power required by heater resistor 26 to achieve 200 degrees centigrade above ambient temperature is very small, being on the order of 0.010 watt.

In the preferred embodiment at zero airflow velocity, thermal conduction from heater resistor grid 26, largely through surrounding air space including air space 30, heats identical temperature sensing resistor grids 22 and 24 to an average temperature of about 60–70% of the temperature elevation of heater element 26. In the preferred embodiment illustrated, sensor grids 22 and 24 are precisely symmetrically located with respect to heater grid 26 so that at zero airflow they have identical temperatures and have no differences between their resistances. Consequently, a small probe current, 0.1–1.0 milli-amperes preferred, through both sensor resistances 22 and 24 will develop no voltage difference at zero airflow velocity.

With airflow present, upstream resistors sensor 22 will be cooled by the transportation of heat away from sensor 22 toward heater resistor grid 26, whereas downstream sensor 24 will be heated by a transportation of heat toward the sensor from heat resistor grid 26. Consequently, a resistance difference between sensor resistances 22 and 24 will be present with a corresponding difference in voltage drop which is a measure of the air flow. Typical unamplified voltage differences can be as high as 0.1 volt at a 1500 feet/minute flow velocity.

In the preferred operation of the present sensor, sensors 22 and 24 are operated with constant current such that temperature field changes can be sensed under flow conditions as previously described. Other operating arrangements are also possible.

Because of the exceedingly small thermal mass of the heater and sensor element structure and the thermal insulation provided by the thin silicon nitride connecting means to the supporting silicon body, and because of the surrounding air space, response time of the present sensor is very short, with response time constants of 0.005 seconds having been measured. Consequently, sensor elements 22 and 24 can respond very rapidly to air flow changes.

In the preferred embodiment of the present sensor, ambient temperature is monitored by a reference resistor 38 which is heat sunk onto semiconductor body 20. Resistor 38 may be a permalloy grid formed substantially like grids 22, 24 and 26 and is typically encapsulated in dielectric layers 28 and 29 and mounted on surface 36.

The typical 0.8 micron total thickness of dielectric layers 28 and 29 is very thin and, accordingly, permits relatively good heat conduction and transfer perpendicular to the layers to and from resistive grids 22, 24, 26 and 38. Thus, reference resistor 38, being attached by the encapsulating dielectric directly to surface 36 of semiconductor body 20, readily monitors the temperature of the semiconductor body, which stays within 0.5 degrees centigrade of ambient temperature even with resistor grid 26 elevated to 200 degrees centigrade above ambient. Accordingly, heat sunk reference resistor 38 may be used to monitor ambient air flow temperature by monitoring a temperature that is very close to that of semiconductor body 20, which in turn is very close to ambient temperature.

Figure 6:
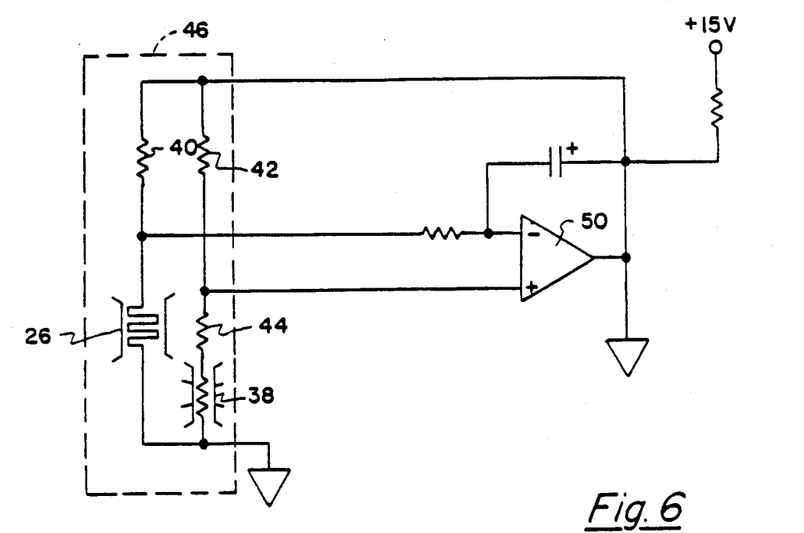
FIG. 6 illustrates circuitry for operating the disclosed sensor.

As previously indicated in the preferred operation of the present sensor, heater 26 is operated at a constant temperature above ambient temperature, sensors 22 and 24 being operated at constant current, and the changing temperatures of sensors 22 and 24 are sensed as changes in resistance. Circuits for accomplishing these functions are illustrated in FIG. 6. The smaller circuit controls the temperature of heater 26 while the larger circuit provides an output voltage that is proportional to the resistance difference between heat sensing resistors 22 and 24.

The heater control circuit illustrated in FIG. 6 uses a wheatstone bridge 46 to maintain heater 26 at a constant temperature rise above ambient as sensed by heat sunk reference resistor 38. Wheatstone bridge 46 is shown comprising heater resistor 26 and a resistor 40 in its first leg and a resistor 42, heat sunk resistor 38 and a resistor 44 in its second leg. An error integrator comprising amplifier 50 keeps bridge 46 balanced by varying the potential across it and thus the power dissipated in heater 26.

The circuity which monitors the resistance difference between downstream sensor 24 and upstream sensor 22 includes a constant current source 52 comprising an amplifier 72 and a differential amplifier 54 comprising amplifier 68 and 70. The constant current source drives a wheatstone bridge comprising two high impedance resistors 56 and 58 in one leg and the two sensing resistors 22 and 24 with a nulling potentiometer 60 in the other leg. The gain of differential amplifier 54 is adjusted by potentiometer 62. Output 64 provides a voltage that is proportional to the resistance difference between the two sensing resistors 22 and 24.

Upstream sensor resistor 22 preferably has an inner edge 76 in close proximity (5 to 10 microns, for example) to the near edge 78 of heater resistor grid 26. At such a separation from near edge 78 of heater resistor grid 26, the zero flow air temperature near heater resistor edge 78 is close to that of edge 78. In a typical embodiment, where sensors 22 and 24 have a width of approximately 100 microns, outer edge 80 of sensor resistor grid 22 is located approximately 100 microns from near edge 78 of heater resistor grid 26. At the 100 micron separation, the zero airflow temperature is closer to that of the ambient air stream and to that of silicon chip 20 than it is to the temperature of heater resistor 26.

Therefore, outer edge 80 of sensor resistor grid 22 is easily cooled to near the limiting temperature of silicon chip 20 by low velocity airflow, whereas the inner regions of sensor resistor grid 22 (near edge 76) are more tightly coupled thermally to heater resistor 26 and respond more readily to the higher airflow velocity before the limiting temperature of the ambient airstream is approached. Accordingly, the composite effect of the temperature change from each resistor grid line (lines spaced over the approximately 5–100 micron distance from heater edge 76) for an increment of airflow is to keep the corresponding increment on the upstream resistor temperature response curve more nearly constant over a broad airflow range.

As shown in FIG. 1, areas 82 are cut in the silicon nitride to facilitate etching as further described below. Overall geometry, including that of leads 92, is preferably made symmetrically to insure symmetrical heat conduction properties on members 32 and 34. Leads 92 connect to pad areas 90 for electrically connecting sensor elements 22, 24, 26, and 38 with circuitry 13 as previously discussed.

Elements 22 and 24 have a preferred resistance in one example of 1200 ohms and element 26 has a preferred resistance in that example of 520 ohms. In this embodiment, sensors 22 and 24 have a width of approximately 100 microns and a length of approximately 175 microns. As previously indicated, in this example the proximal edges of sensors 22 and 24 are in close proximity (e.g., 5–10 microns) away from heater 26. That is, edge 76 of sensor 22 is 5–10 microns away from edge 78 of heater 26, and edge 84 of sensor 24 is 5–10 microns away from edge 86 of heater 26.

As with other dimensions listed in the present application, the above dimensions are preferred dimensions which have been used in actual devices and are not deemed to be limiting, since these parameters could be substantially varied depending upon application.

Figure 2:
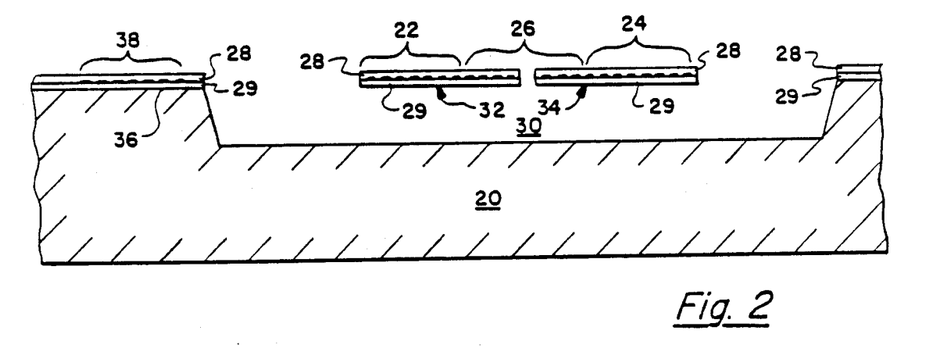
Figure 4:
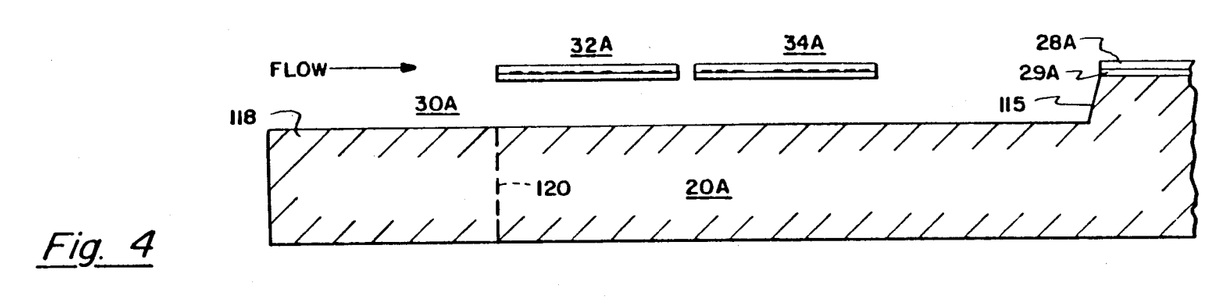
Figure 5:
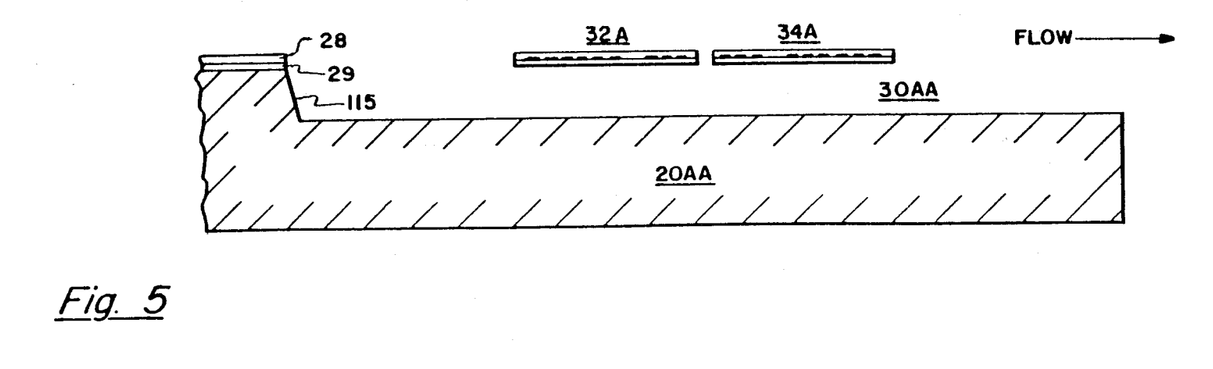

Sensing elements 22 and 24 may be located within the boundaries of a walled depression 30 as illustrated in FIG. 2. Alternately, elements 22 and 24 may be located at the edge of a chip or body so that either the upstream portion of a depression 30A is open to receive flow unimpeded by a sidewall, as shown in FIG. 4, or open at the downstream side so that flow may more easily exit, or be more easily drawn through, an air space 30AA as illustrated in FIG. 5. Note that the embodiment of FIG. 4 may be modified by removing at least a portion of the leading edge of body 20A, thus increasing the exposure of the leading edge of member 32A to flow; for example, portion 118 of body 20A may be removed back to line 120.

The preferred process of fabricating the present sensor comprises providing a (100) silicon wafer 20 having a surface 36 which receives a layer 29 of silicon nitride. Layer 29 is typically 4000 angstroms thick and is typically deposited by standard sputtering techniques in a low pressure gas discharge. Next, a uniform layer of permalloy, typically 80% nickel and 20% iron and 800 angstroms thick, is deposited on the silicon nitride by sputtering.

Using a suitable photo mask, a photoresist and a suitable etchant, permalloy elements such as 22, 24, 26 and 38 are delineated. A second layer 28 of silicon nitride, typically 4000 angstroms thick, is then sputter-deposited to provide complete coverage of the permalloy configuration and thus protect the resistive element from oxidation. Openings 82 are then etched through the nitride to the (100) silicon surface in order to delineate each member such as 32 and 34. The relative sizes of openings 82 are largely a matter of design choice. Dotted lines 114 represent the shape of depressions such as 30 under the ends of members such as 32 and 34.

Finally, anisotropic etchant that does not appreciably attack the silicon nitride is used to etch out the silicon in a controlled manner from beneath members such as 32 and 34 (KOH plus Isopropyl alcohol is a suitable etchant). The sloping sides of the etched depression such as 30 are bounded by (111) and other crystal surfaces that are resistive to the etchant. The depression bottom, a (100) surface which is much less resistant to the etchant, is located at a specified distance (e.g., 125 microns) from the members, typically by adjusting the duration of the etch. A doped silicon etch stop (e.g., a boron-doped layer) may also be used to control the depth of the depression, although such stops are not typically necessary when fabricating the present sensor. By adjusting the duration of the etch, the depth of depressions such as 30 can be controlled to a precision of about three microns or to about two percent. This precision results in a precise reproducibility of the thermal conductance of the air space surrounding the members and a correspondingly precise reproducibility of air flow response.

Figure 3:
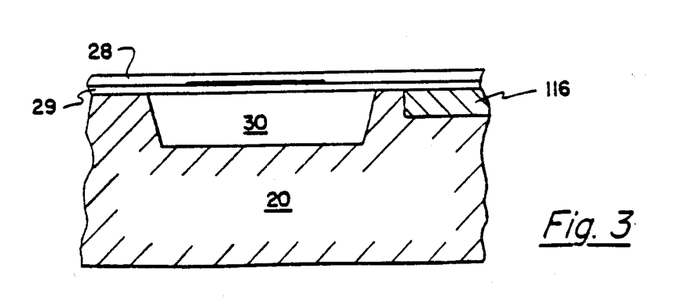

In order to obtain efficient undercutting of cantilever members and in order to undercut bridged members of the type shown in FIG. 3, the predetermined configuration of the member, e.g., typically a straight edge such as 110 (FIG. 1) or an axis of the member, is oriented at a non-zero angle 112 to the 110 axis of the silicon (while fabricating sensors such as the one disclosed will typically involve placing a straight member edge or an axis at an angle to the 110 silicon axis, it is conceivable that a member could be shaped such that no straight edges are involved or that no axis is easily defined, but that the configuration itself is still oriented to achieve the undercutting or to achieve in a minimum time, as further discussed below).

By making angle 112 substantially 45 degrees, the member will be undercut in a minimum amount of time. Further, using a non-zero orientation permits fabrication of two-ended bridges such as shown in FIG. 3. Such members are substantially impossible to make in a single processing step with an anisotropic etch and with the member edges oriented substantially with the 110 direction. This is because an anitropic etch will not appreciably undercut at the inside corners or at the (111) crystal planes exposed along the edges of a member if the edges of the members are oriented with the 110 direction. Further, if an isotropic etch is used to undercut the members, substantially less repeatability and precision is achieved, since such an etch does not discriminate between the various crystal planes.

Making angle 112 a 45 degree angle also permits rapid rounding and smoothing of the semiconductor and support interface with the member (see dashed lines 114 defining the ends of members 32 and 34), thus avoiding a stress connection point that otherwise occurs where two (111) planes intersect below dielectric layer 29.

In addition to making angle 112 substantially 45 degrees, it is preferred that the remaining edges of openings 82, e.g. those edges 111 and 113 not defining the edges of members 32 and 34, be oriented either substantially in line with the 110 direction (edges 111 in FIGS. 1, 1A, and 1B) or substantially normal to the 110 direction (edges 113 in FIGS. 1, 1A, and 1B). If openings 82 are defined by the edges of members at a 45 degree angle to the 110 direction (e.g., by edges 110 and 110A for member 34 and by edges 110B and 110C for member 32), by edges 111 in line with the 110 direction, and by edges 113 normal to the 110 direction, there will be no undesirable undercutting below dielectric layer 29; i.e., the only undercutting that will then occur when forming depression 30 is undercutting below member 32 and 34, and depression 30 will be defined in size by openings 82 and the area below member 32 and 34. The slanted walls 115 of depression 30 are then formed by (111) planes, which are a natural etch stop to undercutting. The size of openings 82 is largely a matter of design choice.

FIG. 3 shows a region 116 for integration of circuitry, for example, portions of the circuitry illustrated in FIG. 6.

For the embodiments shown, typical dimensions of members such as 32 and 34 are 0.005 inch–0.007 inch wide, 0.010–0.020 inch long, and 0.8–1.2 microns thick. Typical permalloy elements such as elements 22, 24, 26 and 38 have a thickness of approximately 800 angstroms (typically in the range of approximately 800 angstroms to approximately 1600 angstroms) with a preferred composition of 80% nickel and 20% iron and a resistance value within the range of approximately 200 ohms to approximately 2000 ohms at room temperature, e.g., at approximtely 20–25 degrees centigrade (at permalloy element temperatures up to approximately 400 degrees centigrade resistance values increase by a factor of up to approximately 3). Line widths within permalloy grids may be approximately 5 microns with a 5 micron spacing. Depressions such as 30 typically have a 0.005 inch (125 micron) depth spacing between members such as 32 and 34 and the semiconductor body such as 20, but the spacing can easily vary in the range of approximately 0.001 inch to approximately 0.010 inch. A typical thickness of the semiconductor body or substrate such as 20 is 0.008 inch. (As previously indicated, dimensions provided are illustrative only and are not to be taken as limitations.)

Typical operating temperatures of heater elements such as 26 are in the range of approximately 100–200 degrees centigrade with approximately 160 degrees centigrade above ambient being the preferred operating temperature. Using the preferred permalloy element, this can be accomplished with only a few milliwatts of input power.

A heater resistance element having a 200–1000 ohm preferred resistance at 25 degrees centigrade provides the desired power dissipation to achieve the preferred operating temperature at a convenient voltage of a few volts and a convenient current of, for example, 2 to 5 milliamperes.

The present invention is to be limited only in accordance with the scope of the appended claims since persons skilled in the art may devise other embodiments still within the limits of the claims.

The embodiments of the invention in which an exclusive property or right is claimed are defined as follows:

1. A method of fabricating a semiconductor device comprising a thin film member having a predetermined configuration bridging a depression etched into a first surface of a semiconductor body, the member being connected to the first surface at first and second substantially opposing ends of the predetermined configuration, the depression opening to the first surface along an edge on each side of the member, the method comprising steps of:

provide a semiconductor body with a first surface having a predetermined orientation with respect to a crystalline structure in the semiconductor body;

applying a layer of thin film material of which the member is comprised onto the first surface; and exposing through the thin film material first and second openings to the first surface, the first opening being bounded in part by one edge of the member, the second opening being bounded in part by the other edge of the member, both openings also being bounded in part by a boundary connected to an edge of the member, at least one of the boundaries having a predetermined boundary configuration formed so that, when an anisotropic etch is placed on the openings to undercut the member and form the depression, there will be no substantial undercutting of the semiconductor body below the thin film material at the predetermined boundary configuration.

2. A method of fabricating a semiconductor device comprising a thin film member having a predetermined configuration bridging a depression etched into a first surface of a semiconductor body, the member being connected to the first surface at first and second substantially opposing ends of the predetermined configuration, the depression opening to the first surface along an edge on each side of the member, the method comprising the steps of:

providing a semiconductor body comprising (100) silicon having a (100) plane, a 110 direction, and a first surface substantially parallel to the (100) plane;

applying a layer of thin film material of which the member is comprised onto the first surface;

exposing through the thin film material first and second openings to the first surface, the openings being defined so that the member is oriented at a non-zero angle to the 110 direction, the first opening being bounded in part by one edge of the member, the second opening being bounded in part by the other edge of the member, both openings also being bounded in part by a boundary connected to an edge of the member, at least one of the boundaries having a boundary component substantially in line with the 110 direction or substantially normal to the 110 direction;

applying an anisotropic etch to the exposed surface areas to undercut the member; and whereby there will be no substantial overhang of the thin film material along the boundary components substantially in line with or normal to the 110 direction.

3. The method of claim 2 wherein at least one of the member edges comprises a substantially straight edge oriented at the non-zero angle.

4. The method of claim 3 wherein the non-zero angle is substantially 45 degrees, whereby the member will be undercut with maximum efficiency.

5. The method of claim 2 wherein the predetermined configuration has an axis which is oriented at the non-zero angle.

6. The method of claim 5 wherein the non-zero angle is substantially 45 degrees, whereby the member will be undercut with maximum efficiency.

7. The method of claim 2 wherein the non-zero angle is substantially 45 degrees, whereby the member will be undercut with maximum efficiency.

8. An composite semiconductor device, comprising:

a semiconductor body with a first surface having a predetermined orientation with respect to a crystalline structure in the semiconductor body, the semiconductor body having a depression formed into the first surface of the body;

a layer of thin film material covering at least a portion of the first surface; and a thin film member comprising the layer of material, the member having a predetermined configuration bridging the depression, the member being connected to the first surface at substantially opposing ends of the predetermined configuration, the depression opening to the first surface along an edge on each side of the member, the layer of material comprising first and second openings, the first opening being bounded in part by one edge of the member, the second opening being bounded in part by the other edge of the member, both openings also being bounded in part by a boundary connected to an edge of the member, at least one of the boundaries having a predetermined boundary configuration formed so that, when an anisotropic etch is placed on the openings to undercut the member and form the depression, there will be no substantial undercutting of the semiconductor body below the thin film material at the predetermined boundary configuration.

9. An composite semiconductor device, comprising:

a semiconductor body having a depression formed into a first surface of the body, the semiconductor body comprising (110) silicon and having a (100) plane and a 110 direction, the first surface of the semiconductor body being substantially parallel to the (100) plane;

a layer of thin film material covering at least a portion of the first surface; and a thin film member having a predetermined configuration bridging the depression, the member being connected to the first surface at first and second substantially opposing ends of the predetermined configuration, the predetermined configuration being oriented at a non-zero angle to the 110 direction, the depression opening to the first surface along an edge on each side of the member, the layer of material comprising first and second openings, the first opening being bounded in part by one edge of the member, the second opening being bounded in part by the other edge of the member, both openings also being bounded in part by a boundary connected to an edge of the member, at least one of the boundaries having boundary components substantially in line with the 110 direction or substantially normal to the 110 direction and having a predetermined boundary configuration such that an anisotropic etch placed on the openings will form the depression with no substantial overhang of the thin film material along the boundary components substantially in line with or normal to the 110 direction.

10. The apparatus of claim 9 wherein at least one of the member edges comprises a substantially straight edge oriented at the non-zero angle.

11. The apparatus of claim 10 wherein the non-zero angle is substantially 45 degrees, whereby the matter will be undercut with maximum efficiency.

12. The apparatus of claim 9 wherein the predetermined configuration has an axis which is oriented at the non-zero angle.

13. The apparatus of claim 12 wherein the non-zero angle is substantially 45 degrees, whereby the member will be undercut with maximum efficiency.

14. The apparatus of claim 9 wherein the non-zero angle is substantially 45 degrees, whereby the member will be undercut with maximum efficiency.

* * * * *